United States Patent
Gregory et al.

(10) Patent No.: US 10,740,560 B2
(45) Date of Patent: Aug. 11, 2020

(54) SYSTEMS AND METHODS FOR EXTRACTING FUNDER INFORMATION FROM TEXT

(71) Applicant: Elsevier, Inc., New York, NY (US)

(72) Inventors: Michelle Gregory, Wassenaar (NL); Subhradeep Kayal, Amsterdam (NL); Georgios Tsatsaronis, Halfweg (NL); Zubair Afzal, Rotterdam (NL)

(73) Assignee: Elsevier, Inc., New York, NY (US)

( * ) Notice: Subject to any disclaimer, the term of this patent is extended or adjusted under 35 U.S.C. 154(b) by 141 days.

(21) Appl. No.: 16/020,408

(22) Filed: Jun. 27, 2018

(65) Prior Publication Data

US 2019/0005020 A1 Jan. 3, 2019

Related U.S. Application Data

(60) Provisional application No. 62/527,435, filed on Jun. 30, 2017.

(51) Int. Cl.
*G06F 40/295* (2020.01)
*G06K 9/46* (2006.01)
(Continued)

(52) U.S. Cl.
CPC .......... *G06F 40/295* (2020.01); *G06F 40/216* (2020.01); *G06F 40/47* (2020.01);
(Continued)

(58) Field of Classification Search
CPC .............................. G06F 17/278; G06F 40/295
(Continued)

(56) References Cited

U.S. PATENT DOCUMENTS 7,461,063 B1 * 12/2008 Rios ........................ G06F 17/18
7,912,705 B2 3/2011 Wasson et al.
(Continued)

FOREIGN PATENT DOCUMENTS

| CN | 103440233 A | 9/2013 |
| CN | 105938495 A | 4/2016 |
| CN | 106227750 A | 7/2016 |

OTHER PUBLICATIONS

Gross, Mark, et al., "Extracting Funder and Grant Metadata from Journal Articles," (https://www.balisage.net/Proceedings/vol17/html/Gross01/BalisageVol17-Gross01.html); Aug. 2016.
(Continued)

*Primary Examiner* — Shaun Roberts
(74) *Attorney, Agent, or Firm* — Dinsmore & Shohl LLP (57) ABSTRACT

Systems and methods of extracting funding information from text are disclosed herein. The method includes receiving a text document, extracting paragraphs from the text document using a natural language processing model or a machine learning model, and classifying, using a machine learning classifier, the paragraphs as having funding information or not having funding information. The method further includes labeling, using a first annotator, potential entities within the paragraphs classified as having funding information, and labeling, using a second annotator, potential entities within the paragraphs classified as having funding information, where the first annotator implements a first named-entity recognition model and the second annotator implements a second named-entity recognition model that is different from the first named-entity recognition model. The method further includes extracting the potential entities from the paragraphs classified as having funding information and determining, using an ensemble mechanism, funding information from the potential entities.

20 Claims, 6 Drawing Sheets

(51) Int. Cl.
*G06K 9/00* (2006.01)
*G06K 9/62* (2006.01)
*G06F 40/47* (2020.01)
*G06F 40/216* (2020.01)

(52) U.S. Cl.
CPC ..... *G06K 9/00456* (2013.01); *G06K 9/00463* (2013.01); *G06K 9/4638* (2013.01); *G06K 9/6256* (2013.01); *G06K 9/6269* (2013.01)

(58) Field of Classification Search
USPC .......................................................... 704/9
See application file for complete search history.

(56) References Cited

U.S. PATENT DOCUMENTS

| | | | |
|---|---|---|---|
| 9,280,535 B2 | 3/2016 | Varma et al. | |
| 9,424,492 B2 | 8/2016 | Murray et al. | |
| 9,710,456 B1* | 7/2017 | Mengle | G06F 17/2785 |
| 2004/0006457 A1* | 1/2004 | Dehlinger | G06F 16/35 |
| | | | 704/5 |
| 2011/0251977 A1* | 10/2011 | Cialowicz | G06F 17/278 |
| | | | 705/36 R |
| 2012/0158400 A1 | 6/2012 | Schmidt et al. | |
| 2013/0218801 A1* | 8/2013 | Rago | G06Q 30/0279 |
| | | | 705/342 |
| 2013/0117268 A1 | 9/2013 | Smith et al. | |
| 2013/0246296 A1* | 9/2013 | Sierra | G06Q 20/322 |
| | | | 705/329 |
| 2013/0282361 A1* | 10/2013 | Hartl | G06F 17/278 |
| | | | 704/9 |
| 2014/0223284 A1* | 8/2014 | Rankin, Jr. | G06F 40/186 |
| | | | 715/234 |
| 2014/0277921 A1* | 9/2014 | Gujjar | G06Q 10/20 |
| | | | 701/32.9 |
| 2015/0154284 A1* | 6/2015 | Pfeifer | G06F 17/278 |
| | | | 707/723 |
| 2015/0186471 A1* | 7/2015 | Yammahi | G06F 16/2468 |
| | | | 707/780 |
| 2015/0269663 A1* | 9/2015 | Tarrant | G06Q 40/00 |
| | | | 705/35 |
| 2016/0104077 A1 | 4/2016 | Jackson, Jr. et al. | |
| 2016/0117551 A1 | 4/2016 | Hausmann et al. | |
| 2016/0155069 A1* | 6/2016 | Hoover | G06Q 30/06 |
| | | | 706/12 |
| 2016/0239579 A1 | 8/2016 | Zholudev et al. | |
| 2016/0292573 A1* | 10/2016 | Babko-Malaya | G06N 5/022 |
| 2017/0060835 A1 | 3/2017 | Radford et al. | |
| 2018/0336182 A1* | 11/2018 | Lachmi | G06F 16/9535 |

OTHER PUBLICATIONS

Giannakopoulos, Anastasios, et al., "Funding Information Extraction" (http://www.opensciencefair.eu/posters/funding-information-extraction).

Klampfl, Stefan, et al., "Reconstructing the Logical Structure of a Scientific Publication Using Machine Learning", (https://www.researchgate.net/publication/308960342_Reconstructing_the_Logical_Structure_of_a_Scientific_Publication_Using_Machine_Learning); May 2016.

Gross, Mark, "Extracting funder and grant metadata from journal articles: using language analysis to automatically extract metadata" (https://www.dclab.com/webinars/extracting-funder-and-grant-metadata-from-journal-articles-usinglanguage-analysis-to-automatically-extract-metadata).

International Search Report and Written Opinion of the International Searching Authority, dated Nov. 8, 2018, issued in PCT/US2018/039997.

* cited by examiner

SYSTEMS AND METHODS FOR EXTRACTING FUNDER INFORMATION FROM TEXT

CROSS REFERENCE TO RELATED APPLICATIONS

This application claims the benefit of U.S. Provisional Application No. 62/527,435, filed Jun. 30, 2017, the contents of which are hereby incorporated by reference in its entirety.

TECHNICAL FIELD

The present specification generally relates to systems and methods for extracting funder information from text and, more specifically, to systems and methods for extracting funding organizations, grant numbers, program names, and project details from text utilizing a combination of machine learning and natural language processing methods.

BACKGROUND

Scientific researchers often maintain relationships with a number of funding organizations in order to obtain the financial support required to study a particular topic or area of interest. Conventional approaches for extracting funding information from scientific articles may be difficult or challenging to perform because such approaches involve more than retrieving information from a data source.

SUMMARY

In one embodiment, a method of extracting funding information from text includes receiving, at a computing device, a text document, extracting paragraphs from the text document using at least one of a natural language processing model or a machine learning model, and classifying, using a machine learning classifier, the paragraphs as having funding information or not having funding information. The method further includes discarding the paragraphs classified as not having funding information, labeling, using a first annotator, one or more potential entities within the paragraphs classified as having funding information, and labeling, using a second annotator, one or more potential entities within the paragraphs classified as having funding information, where the first annotator implements a first named-entity recognition model and the second annotator implements a second named-entity recognition model that is different from the first named-entity recognition model, and the one or more potential entities comprise at least one unique entity labeled by the first annotator or the second annotator. The method further includes extracting the one or more potential entities from the paragraphs classified as having funding information and determining, using an ensemble mechanism, funding information from the one or more potential entities.

In another embodiment, a system for extracting funding information from text includes a processor and a non-transitory, processor-readable memory coupled to the processor. The non-transitory, processor-readable memory includes a machine readable instruction set stored thereon that, when executed by the processor, causes the processor to: receive a text document, extract paragraphs from the text document using at least one of a natural language processing model or a machine learning model, and classify with a machine learning classifier the paragraphs as having funding information or not having funding information. The machine readable instruction set, when executed, further causes the processor to: discard the paragraphs classified as not having funding information, label, with a first annotator one or more potential entities within the paragraphs classified as having funding information, and label, with a second annotator, one or more potential entities within the paragraphs classified as having funding information, where the first annotator implements a first named-entity recognition model and the second annotator implements a second named-entity recognition model that is different from the first named-entity recognition model, and the one or more potential entities comprise at least one unique entity labeled by the first annotator or the second annotator. The machine readable instruction set, when executed, further causes the processor to: extract the one or more potential entities from the paragraphs classified as having funding information and determine, with an ensemble mechanism, a funding information from the one or more potential entities.

In yet another embodiment, a grid-computing system for extracting funding information from text is disclosed. The grid-computing system includes a first module having a first processor and a first non-transitory, processor-readable memory coupled to the first processor, a second module having a second processor and a second non-transitory, processor-readable memory coupled to the second processor, a third module having a third processor and a third non-transitory, processor-readable memory coupled to the third processor, and a fourth module having a fourth processor and a fourth non-transitory, processor-readable memory coupled to the fourth processor. The first module, the second module, the third module, and the fourth module are communicatively coupled through a network. The first non-transitory, processor-readable memory comprising a first machine readable instruction set stored thereon that, when executed by the first processor, causes the first processor to classify paragraphs extracted from a text document as having funding information or not having funding information. The second non-transitory, processor-readable memory comprising a second machine readable instruction set stored thereon that, when executed by the second processor, causes the second processor to label, with a first annotator one or more potential entities within the paragraphs classified as having funding information. The third non-transitory, processor-readable memory comprising a third machine readable instruction set stored thereon that, when executed by the third processor, causes the third processor to label, with a second annotator, one or more potential entities within the paragraphs classified as having funding information, where the first annotator implements a first named-entity recognition model and the second annotator implements a second named-entity recognition model that is different from the first named-entity recognition model, and the one or more potential entities comprise at least one unique entity labeled by the first annotator or the second annotator. The fourth non-transitory, processor-readable memory comprising a fourth machine readable instruction set stored thereon that, when executed by the fourth processor, causes the fourth processor to determine with an ensemble mechanism a funding information from the one or more potential entities.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

A funding organization provides support for research topics that align with their own mission. Thus, funding organizations may need to ensure they are awarding resources to the appropriate research teams in order to best utilize their resources.

A funding organization may desire to trace or locate the acknowledgement made in a particular scientific article that recognizes their role in providing the financial support required for the research associated with the scientific article for a number of reasons. For example, the funding organization may be made aware of the impact that their funding makes. In addition, the funding organization may be required to report the results to stakeholders or taxpayers in order to justify the funds allocated to a particular researcher or institution. In addition to the funding organizations, other researchers and institutions should also have access to the acknowledgements made in scientific articles as well so that they may discover appropriate funding opportunities for their scientific interests.

Embodiments of the present disclosure relate to computer based systems and methods that automatically detect the presence of and establish relationships between funding organizations, grant numbers, program names, and project details from a variety of textual input formats. Funding bodies need to ensure that they are awarding funds to the right research teams and topics so that they can maximize the impact of the associated funds. At the same time, funding organizations require public access to funded research adopting. For example, the United States Government's policy that all federal funding agencies must ensure public access to all articles and data that result from federally funded research. As a result, institutions and researchers may be required to report on funded research outcomes, and acknowledge the funding source and grants. In parallel, funding bodies should be in a position to trace back these acknowledgements and justify the impact and results of their research allocated funds to their stakeholders and tax-payers alike. Researchers should also be able to have access to such information, which can help them make better educated decisions during their careers, and help them discover appropriate funding opportunities for their scientific interests, experience, and profile.

These situations create unique opportunities for publishers, and more widely, the affiliated industry, to coordinate and develop low-cost, or cost-free, solutions that can serve funding agencies and researchers. A fundamental problem that needs to be addressed is, however, the ability to automatically extract the funding information from scientific articles, which can in turn become searchable in bibliographic databases. The extraction of information relating to funding is not a trivial information retrieval process or analysis problem to solve. Funding information may be embedded and/or referenced in various locations within a text document. Additionally, funding information may be recited along with other acknowledgements to persons or organizations as well as contributors, which are not per se funding bodies or grants. As such, the ability to distinguish between each of these segments of text requires natural language processing and/or machine learning techniques to automatically extract the funding information from a text document.

This may be accomplished by combining machine learning and natural language processing methods. The method may be implemented within an extendible grid-computing framework allowing for automatic mining of large amounts of content in an efficient and accurate manner. As a result, the systems and methods extract funding information from text so that, for example, a succinct picture of the economic landscape of the research industry may be obtained.

In embodiments, funding information may be automatically extracted from text using natural language processing and machine learning techniques. Given a raw text input, the automated extraction of funding information from text generally translates into two separate tasks. First, all text segments containing potential entities are identified. Second, the text segments may be processed (i.e., annotated) to identify and extract the potential entities. In other words, a coarse-to-fine search is employed where the location of potential entities is identified and then the potential entities are extracted and analyzed for their particular relevance as funding information.

In some embodiments, annotators implementing machine learning models are trained to perform and execute one or more of the steps of extracting funding information from text. Furthermore, to improve the accuracy and reduce computational time required to extract funding information from text two or more trained machine learning approaches. For example, some trained machine learning approaches may implement Conditional Random Fields (CRF), Hidden Markov Modeling (HMM), Maximum Entropy Estimation (MaxEnt) or the like to determine potential entities from the text. The potential entities identified from each of the two or more trained machine learning approaches are then processed using a unique ensemble mechanism. The ensemble mechanism is trained to identify the correct potential entities, which correspond to the funding information within a text document.

Taken together, each of the processes implemented in the system and method of automatically extracting funding information from text improve detection accuracy and lower computational cost and time. For example, the classification of text segments (e.g., paragraphs) as having or not having funding information may improve detection accuracy by reducing the text segments, which may produce false-positive matches. Additionally, by reducing the amount of text segments from a text document, computational cost and time may be reduced when annotating the text document for potential entities relating to funding information. Furthermore, by using multiple annotators, recall may be maximized. Recall (or sensitivity) refers to the fraction of relevant instances that have been retrieved over the total amount of relevant instances. In the context of extracting funding bodies for the funding information, the recall may refer to the fraction of the total number of correctly identified funding bodies identified by the annotators over the total number of funding bodies that should have been identified within a text document. Then, the ensemble mechanism maximizes precision in selecting which of the potential entities were correctly identified as funding information. In other words, the number of Therefore, unique structure and steps optimize the system (e.g., a computing device or a grid-computing framework) by lowering processing time and maximizing accuracy as compared to other approaches.

Various embodiments for automatically extracting funding information from text are now described herein below.

Figure 1:
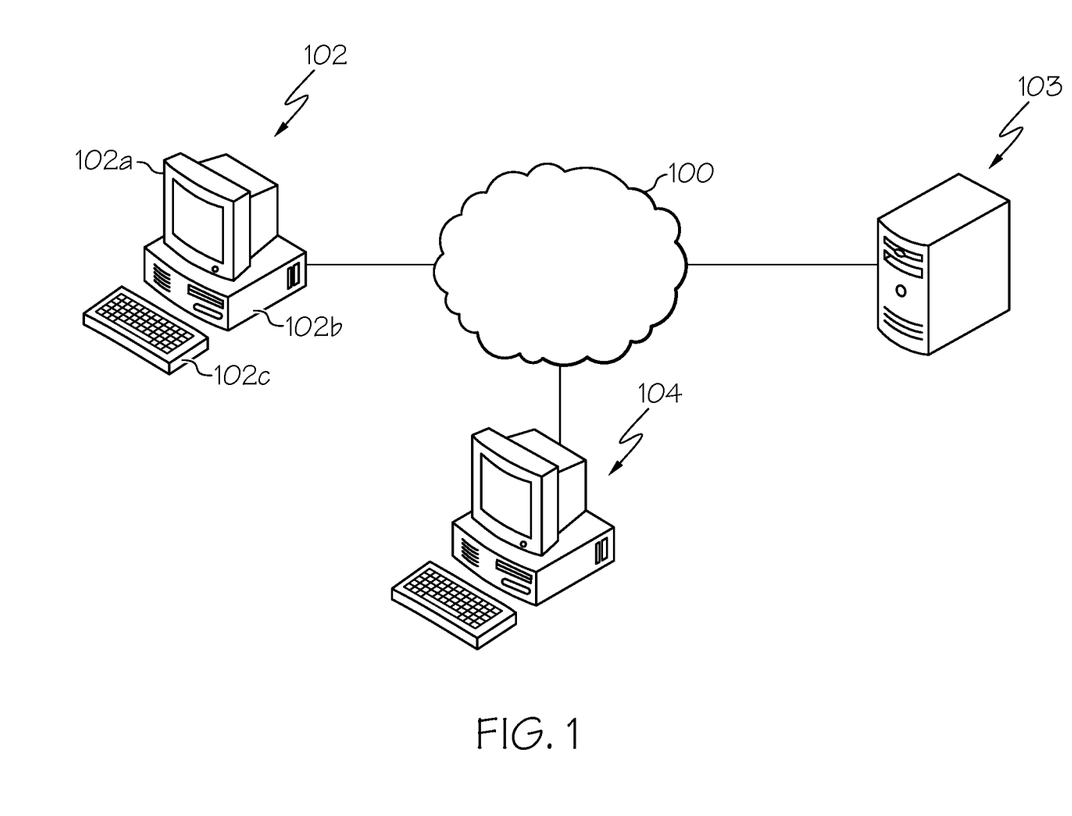
FIG. 1 schematically depicts an example computing network for automatically extracting funding information from text, according to one or more embodiments shown and described herein.

Referring now to the drawings, FIG. 1 depicts an exemplary network 100, illustrating components for a system that automatically extracts funding information from text, according to one or more embodiments shown and described herein. As illustrated in FIG. 1, a network 100 may include a wide area network, such as the internet, a local area network (LAN), a mobile communications network, a public service telephone network (PSTN) and/or other network and may be configured to electronically and/or communicatively connect a user computing device 102, a computing device 103 for extracting funding information from text documents, and an administrator computing device 104.

The user computing device 102 may include a display 102a, a processing unit 102b and an input device 102c, each of which may be communicatively coupled together and/or to the network 100. The user computing device 102 may be used to initiate an electronic search for funding information of one or more text documents. In some embodiments, one or more user computing devices may be implemented to parse and extract funding information from text documents by carrying out one or more specific steps described herein.

Additionally, included in FIG. 1 is the administrator computing device 104. In the event that the computing device 103 for extracting funding information from text documents requires oversight, updating, or correction, the administrator computing device 104 may be configured to provide the desired oversight, updating, and/or correction.

It should be understood that while the user computing device 102 and the administrator computing device 104 are depicted as personal computers and the computing device 103 for generating content summaries is depicted as a server, these are merely examples. More specifically, in some embodiments, any type of computing device (e.g., mobile computing device, personal computer, server, and the like) may be utilized for any of these components. Additionally, while each of these computing devices is illustrated in FIG. 1 as a single piece of hardware, this is also an example. More specifically, each of the user computing device 102, the computing device 103 for extracting funding information from text documents, and administrator computing device 104 may represent a plurality of computers, servers, databases, and the like. For example, each of the user computing device 102, the computing device 103 for extracting funding information from text documents, and administrator computing device 104 may form a distributed or grid-computing framework for implementing the methods described herein.

Figure 2A:
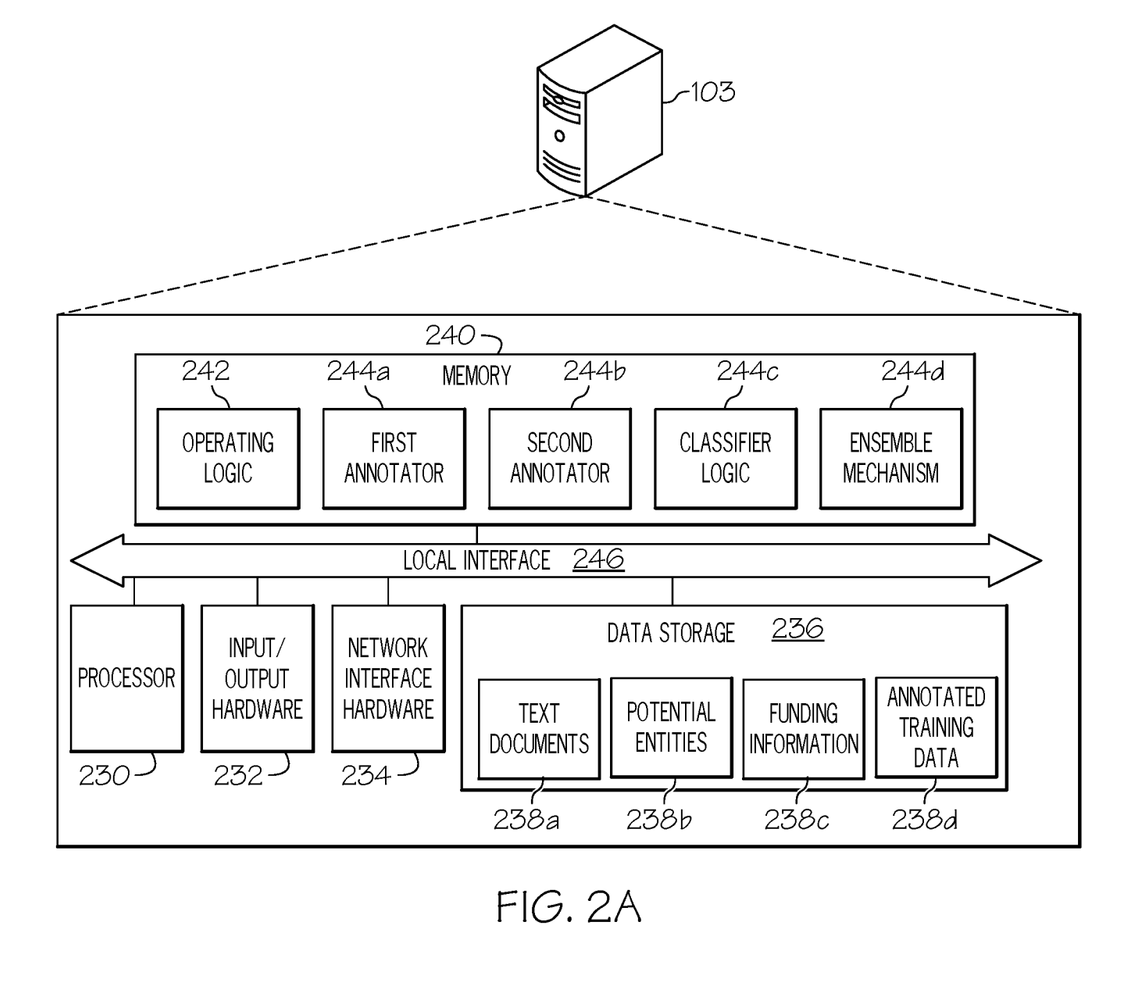
FIG. 2A schematically depicts an example computing device for automatically extracting funding information from text, according to one or more embodiments shown and described herein.

FIG. 2A depicts the computing device 103 for extracting funding information 238c from text documents 238a, from FIG. 1, while further illustrating a system that classifies, labels, extracts and determines funding information 238c from text documents 238a. The computing device 103 for extracting funding information 238c may utilize hardware, software, and/or firmware, according to embodiments shown and described herein. While in some embodiments, the computing device 103 may be configured as a general-purpose computer with the requisite hardware, software, and/or firmware, in some embodiments, the computing device 103 may be configured as a special purpose computer designed specifically for performing the functionality described herein.

As also illustrated in FIG. 2A, the computing device 103 may include a processor 230, input/output hardware 232, network interface hardware 234, a data storage component 236, which stores text documents 238a, potential entities 238b, funding information 238c, and annotated training data 238d, and a memory component 240. The memory component 240 may be machine readable memory (which may also be referred to as a non-transitory processor readable memory). The memory component 240 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 240 may be configured to store operating logic 242 and logic for implementing a first annotator 244a, a second annotator 244b, a classifier 244c, and an ensemble mechanism 244d (each of which may be embodied as a computer program, firmware, or hardware, as an example). A local interface 246 is also included in FIG. 2A and may be implemented as a bus or other interface to facilitate communication among the components of the computing device 103.

The processor 230 may include any processing component(s) configured to receive and execute programming instructions (such as from the data storage component 236 and/or the memory component 240). The instructions may be in the form of a machine readable instruction set stored in the data storage component 236 and/or the memory component 240. The input/output hardware 232 may include a monitor, keyboard, mouse, printer, camera, microphone, speaker, and/or other device for receiving, sending, and/or presenting data. The network interface hardware 234 may include any wired or wireless networking hardware, such as a modem, LAN port, Wi-Fi card, WiMax card, mobile communications hardware, and/or other hardware for communicating with other networks and/or devices.

It should be understood that the data storage component 236 may reside local to and/or remote from the computing device 103 and may be configured to store one or more pieces of data for access by the computing device 103 and/or other components. As illustrated in FIG. 2A, the data storage component 236 stores text documents 238a. The text documents 238a may be structured or unstructured text documents 238a. Non-limiting examples of the text documents 238a include full text literature as present in electronic document data repositories, such as books, book chapters, journal articles, legal documents, publication abstracts, project summaries, proposals, patents, or the like in XML, raw text or other formats. The data storage component 236 may also store potential entities 238b. The potential entities 238b may include a database of known entities including, for example, funding bodies (i.e., names of funding organizations) and/or grants (i.e., grant numbers and/or grant names), which may be utilized to identify similar or the same in the text documents 238a. Additionally, the potential entities 238b may include entities that are labeled and extracted from text documents 238a by the two or more annotators, (e.g., the first annotator 244a and second annotator 244b). Similarly, once the potential entities 238b have been determined to be correctly identified from the text document by the ensemble mechanism 244d, they may be stored as funding information 238c in the data storage component 236 for later access and/or use.

The data storage component 236 may also include annotated training data 238d. The annotated training data 238d may include one or more datasets developed from text documents 238a that have been annotated and identified as having accurate or inaccurate annotations. The annotated training data 238d may be utilized for training one or more machine learning models described herein. In some embodiments, the annotated training data 238d may include annotated data that is manually curated or generated from pre-trained annotators. For example, a first set of annotated training data, referred to herein as the "silver set," may be generated using pre-trained annotators. For example, a database of documents may be mined using a texting mining system for the presence of an "Acknowledgement Section." If present, the section may be extracted under the assumption that funding information 238c for the research is often found in this section. Then, using a pre-trained annotation engine using a database containing information about funding organizations may be used. For example, the database may include a list of funding organizations names, abbreviations, or the like, active and/or defunct. To further remove any false positives, for example, which may arise from the detection a person's name within the name of a funding organization, a pre-trained NER model may parse the sections to detect person's names and overlapping annotations. Once the silver set is generated, it may be used for: (i) learning the word clusters for the distributional similarity measure that may be employed within one or the two or more annotators that implements an NER model based on CRFs or other natural language processing models and (ii) train NER models for detecting funding body (FB) labeled entities. That is, such annotators rely on the ability to use distributional similarity measures, which assume that similar words appear in similar contexts.

By way of another non-limiting example, a second set of annotated training data, referred to herein as the "gold set," may be manually curated. For example, scientific articles and other text documents 238a may be annotated with FB and GR labels. The annotators may include subject matter experts determining labels for FB and GR information within the text document. The gold set of annotated training data may be used for training the classifier 244c that detects the paragraphs of the text which contain funding information 238c and the two or more annotators which label potential entities 238b (e.g., FB and GR entities) within the text document.

Included in the memory component 240 are the operating logic 242, and logic for implementing a first annotator 244a, a second annotator 244b, a classifier 244c, and an ensemble mechanism 244d. The operating logic 242 may include an operating system and/or other software for managing components of the computing device 103. The first annotator 244a and second annotator 244b may be stored as logic in the memory component 240 and configured to label (e.g., annotate) one or more potential entities 238b within the text document. For example, the first annotator 244a and the second annotator 244b may receive a paragraph of text, append a label to one or more words within the paragraph of text (e.g., a metadata label), and store and/or extract the appended text from the paragraph of text. Although only a first annotator 244a and a second annotator 244b are depicted and described herein, it should be understood that the systems and methods for extracting funding information 238c may implement two or more annotators. For example, the systems and methods for extracting funding information 238c may implement 3, 4, 5, 6, 7, 8, 9, 10, or more annotators. In some embodiments, the two or more annotators may be complementary. That is, by using multiple annotators, where each implements one or more of a variety of annotation methods, the recall (or sensitivity) of the system may be maximized. For example, one annotator may exhibit better performance than another annotator at identifying and labeling funding bodies having a person's name while the other annotator may exhibit better performance at identifying and labeling organizational or government entities. In other words, the type of model implemented by the annotator for annotating text and/or the training data utilized for training the annotator may influence the performance of the annotator. As a result, each annotator may be better adapted to identify and label particular types of content relative to other annotators.

The first annotator 244a and the second annotator 244b may be configured using named-entity recognition (NER) models. In general, NER models may locate units of information, such as names of organizations, persons and locations, and numeric expressions such as time, date, and money from text. As used herein, the first annotator 244a and the second annotator 244b may implement NER models to locate information referred to herein as entities. Entities may include funding bodies (FB) and/or grants (GR). For example, given text of the form: "This work was supported by the Funding Organization with Grant No. 1234", the first annotator 244a and/or the second annotator 244b may label "Funding Organization" in the text as FB and "1234" as GR. In embodiments, the first annotator 244a and the second annotator 244b may employ rule-based, gazetteer, and machine learning approaches to label entities within the text document. For example, the first annotator 244a and the second annotator 244b may implement an NER model that utilizes one of several sequential learning (i.e., machine learning) approaches, which are discussed herein.

In general, sequential learning approaches model the relationships between nearby data points and their class labels. Sequential learning approaches can be classified as generative or discriminative. One type of generative model is the Hidden Markov Model (HMM), which learns the joint distribution between words and their labels. An HMM is a Markov chain with hidden states where the observed states are words while the hidden states are their labels. Given labeled sentences (e.g., stored in the annotated training data 238d) as training examples, HMMs find the maximum likelihood estimate of the parameters of the joint distribution, a problem for which many algorithmic solutions may be determined. The first annotator 244a or the second annotator 244b may implement Conditional Random Fields (CRFs) which are discriminative. In contrast to HMMs, CRFs find the most likely sequence of labels or entities given a sequence of words. In some embodiments, a Markov Random Field may used to model the relationship between the labels. Additionally, linear chain CRFs may be well suited for sequence analysis, which may be applied to parts-of-speech tagging, shallow parsing and NER models. Another method of modeling data for NER models is to use Maximum Entropy (MaxEnt) models. MaxEnt models select the probability distribution that maximizes entropy, thereby making as little assumptions about the data as possible. As such, MaxEnt estimation may be applied to NER models by the first annotator 244a or the second annotator 244b. These are only a few examples of machine learning models and natural language processing models that the first annotator 244a or the second annotator 244b may implement.

The memory component 240 may also include classifier logic 244c. The classifier 244c may implement a machine learned model, for example, a Support Vector Machine (SVM) or the like. The classifier logic 244c receives text documents 238a or text segments (e.g., paragraphs, sections, footnotes, or the like). In response, the classifier logic 244c determines whether the text segment should be classified as having funding information 238c or not having funding information 238c. While the decision is binary (i.e., having or not having funding information 238c), the classifier logic 244c may be designed to be biased towards classifying false positives. In other words, when the classifier logic 244c classifies a text segment as having funding information 238c the text segment may be determined as more likely than not to have funding information 238c. While the goal of the classifier logic 244c is to reduce the number of text segments for which the two or more annotators must parse and label potential entities 238b within, the classifier logic 244c is just the first step to extracting funding information 238c and therefore should avoid classifying text segments that may include funding information 238c as not having funding information 238c.

To accomplish this goal of classifying text sections as having funding information 238c, in some embodiments, the classifier logic 244c may implement a SVM. Furthermore, in some embodiments, an L2 regularized linear SVM utilizing term frequency-inverse document frequency (TD-IDF) vectors extracted from segments of text based on a bi-gram bag-of-words text may be implemented by the classifier logic 244c. To train the SVM, annotated training data 238d may be used. The annotated training data 238d for training the SVM may include examples of positive and negative text segments (i.e., paragraphs with and without funding information 238c). For example, given a text document 238a, denoted as T, the automated extraction of funding information from the text translates into two separate tasks, (i) identify all text segments $t \in T$, which contain funding information, and (ii) process all the funding text segments t, in order to detect the set of the funding bodies, denoted as FB, and the sets of grants, denoted as GR that appear in the text. By using training data, which contains labeled examples of funding information, the step of classifying text sections as having funding information 238c or not may be viewed as a binary text classification problem. For example, the binary text classification problem may be defined such that given T and the set of all non-overlapping text segments $t_i$, such that the $\cup_i T_i = T$ (where $t_i \in T$), a trained binary classifier can decide for the class label of $t_i$, i.e., $C_{t_i}=1$, if $t_i$ contains funding information, or $C_{t_i}=0$ if not. That is, the trained binary classifier using an SVM, for example implemented by the classifier logic 244c, may be trained on annotated training data that contains example sections of text predefined as having funding information 238c and example sections of text predefined as not having funding information 238c. This allows the classifier logic 244c to distinguish between paragraphs that have and do not have funding information.

Still referring to the memory component 240, logic for implementing the ensemble mechanism 244d may be stored within the memory component 240. The ensemble mechanism 244d will be described in more detail herein, in particular with reference to the methods described in FIGS. 3 and 4. However, in general, once the two or more annotators (e.g., the first annotator 244a and the second annotator 244b) each label one or more potential entities 238b within the text document, the ensemble mechanism 244d determines which of the one or more potential entities 238b correctly refers to the funding information 238c for a given text document. The ensemble mechanism 244d may be configured to implement a machine learned ensemble model that learns a logistic regression model from binary feature vectors generated based on the one or more potential entities 238b identified by the two or more annotators.

Figure 2B:
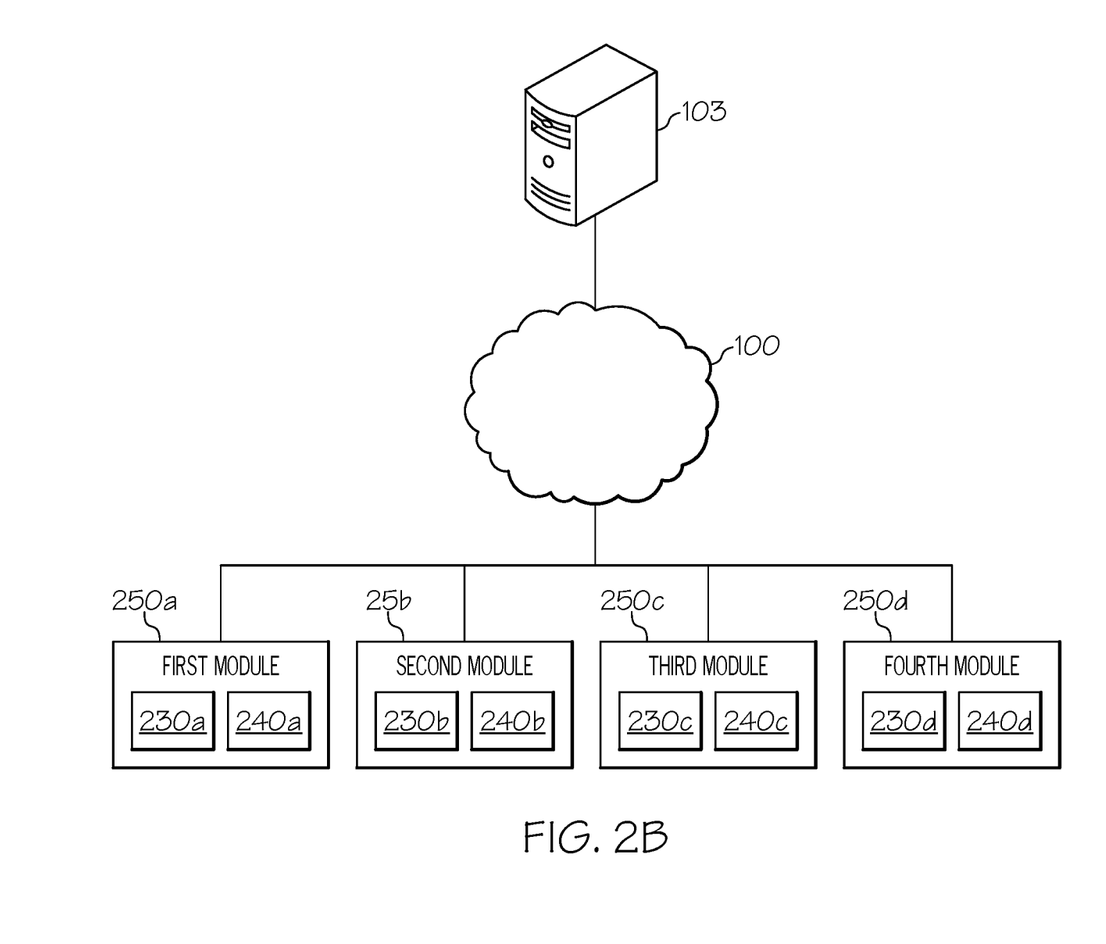
FIG. 2B schematically depicts an example grid-computing environment for automatically extracting funding information from text, according to one or more embodiments shown and described herein.

Referring now to FIG. 2B, an example grid-computing environment implementing a system and method for extracting funding information from text, according to one or more embodiments described herein is depicted. In general, a grid-computing environment is a collection of computer resources from multiple systems configured as nodes to perform different portions of a method. For example, as depicted in FIG. 1, multiple user computing devices 102 located in various locations may be interconnected via a network and each of the multiple user computing devices 102 may be configured to carry out various independent steps of a larger process. Turning to FIG. 2B, a computing device 103 is communicatively coupled to the network 100 and thereby in communication with a first module 250a, a second module 250b, a third module 250c, and a fourth module 250d (collectively referred to as modules 250). Additionally, each of the modules 250 may be a computing device having a processor (230a, 230b, 230c, 230d) and a memory (240a, 240b, 240c, 240d), respectively. The computing device 103 may be configured to send, receive, and store datasets to be used and that are generated while extracting funding information from a text document, while each of the modules 250 are configured to perform a particular function. For example, the first module 250a may be configured as the classifier, which receives text segments (e.g., paragraphs) form a text document and classifies them as either having funding information or not having funding information. The first module 250a may return to the computing device 103 or transmit to other modules 250 the text segments having funding information.

The second module 250b and the third module 250c may be configured as the first annotator and the second annotator, respectively. In some embodiments, the first annotator and the second annotator are different annotators implementing different methods, for example, different machine learned or natural language processing models, for labeling potential entities within the text segments classified as having funding information. As such, the second module 250b and the third module 250c may receive text segments classified as having funding information from the first module 250a or the computing device 103. The second module 250b and the third module 250c may each return one or more potential entities labeled within the text segments to the computing device 103 or transmit them to another module 250. The fourth module 250d, for example, may be configured to perform the task of the ensemble mechanism. As such, the fourth module 250d may receive the one or more potential entities from the text segments and determine which of the one or more potential entities correctly identifies the funding information within a text document.

It should be understood that FIG. 2B only provides an example where the computational resources for carrying out a particular portion of a method or task are completed by an individual module 250. Such a framework efficiently uses computational resources by modularizing and separating the various functionalities for a particular process and running each module 250 separately while having efficient coordination between the modules 250. In other embodiments, the grid-computing framework may include modules coordinated to separately (i) ingest a source file, (ii) extract plain text from the source file, (iii) extract or classify text segments which might contain funding information, (iv) implement sequential learning annotators (e.g., one module for each annotator) to retrieve potential entities from the text segments, (v) combine the outputs from the sequential annotators (e.g., pooling the outputs), and (vi) structure the pooled outputs into an XML, JSON-LD or other format. A grid computing framework allows a system to distribute tasks to modules with available resources to complete the particular task instead of relying on the sequential processing of a single module. In other words, portions of a process may be separated into discrete tasks so that they may be carried out independently of other portions of the process, thereby allowing predefined portions of the process to be assigned and executed by available resources of independent modules as they are available. Alternatively, the process may have to wait for one portion of the process to be completed before the next portion of the process may be executed.

Figure 3:
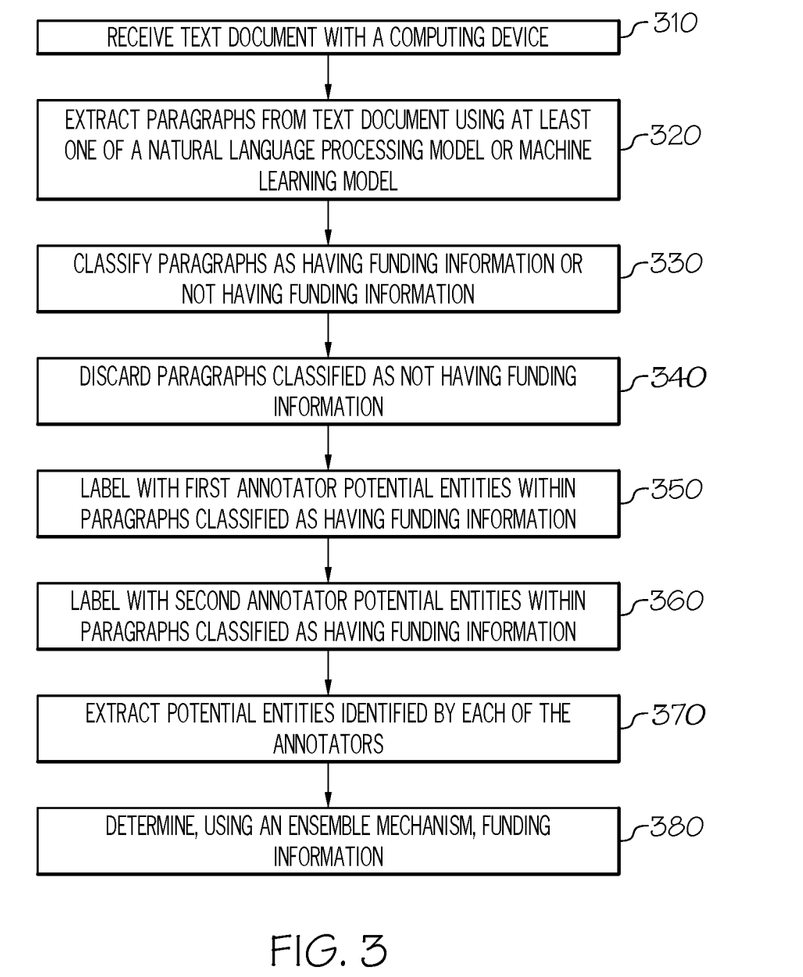
FIG. 3 depicts a flowchart for an example method of extracting funding information from text, according to one or more embodiments shown and described herein.

Referring now to FIG. 3, a flowchart for an example method of extracting funding information from text, according to one or more embodiments described herein is depicted. As stated above the methods for automatically extracting funding information from a text document may utilize natural language processing and machine learning techniques. The following description is intended to provide example embodiments where either or both techniques are utilized. At step 310, a text document may be retrieved from the data storage component or received by the system. The text document may be an unstructured or structured document. In the event the document is unstructured, at step 320, the system may extract text segments from the text document. For example, the text segments may be paragraphs, footnotes, titles, or the like. The system may implement one or a variety of means for extracting paragraphs from the text document. For example, the system may utilize a standard discriminative classifier, which is trained on text documents that included labeled segments identifying paragraphs, to identify and extract text segments, such as paragraphs, which will be used in the description herein.

In some embodiments, a natural language processing technique may be implemented. For example, the natural language processing technique may employ a mechanism for finding end-of-sentence points and then determine whether a paragraph boundary exists between each sentence. To determine whether a paragraph boundary exists between each sentence some heuristics may be used to guide the process. In some embodiments, the similarity between topics within the sentences may be evaluated to determine whether a paragraph boundary exists. When the topics are determined to be similar, they may be considered to be within the same paragraph. However, when the topics or a keyword within the sentence differs from an adjacent sentence, then that sentence may indicate a paragraph boundary should be inserted between the sentences.

At step 330, the system implements a classifier that classifies each of the paragraphs as either having funding information or not having funding information. As described above, the classifier may be a machine learned model implementing a SVM. Once the paragraphs are classified, in some embodiments, the method discards paragraphs classified as not having funding information, at step 340. Discarding paragraphs allows system resources may be made available for other tasks, thereby improving performance. The system then implements two or more annotators to each label one or more potential entities within the paragraphs classified as having funding information. For example, at step 350, a first annotator receives the paragraphs classified as having funding information and annotates the contents of the paragraph by labeling one or more first potential entities. The one or more potential entities may include funding bodies (FB), grants (GR), or both. At step 360, a second annotator also receives the paragraphs classified as having funding information and annotates the contents of the paragraph by labeling one or more second potential entities. The one or more first potential entities and the one or more second potential entities may each include a distinct set of potential entities or may include at least one common potential entity. That is, the one or more potential entities include at least one unique entity labeled by the first annotator and/or the second annotator. The first annotator and the second annotator implement different types of NER models, for example, machine learned models based on a conditional random field (CRF), Hidden Markov model (HMM), maximum entropy estimation (MaxEnt) model or the like. By implementing two or more annotators, the system may benefit from the complementary strengths of each model in identifying potential entities. That is, by using multiple annotators, where each implements one or more of a variety of annotation methods, the recall (or sensitivity) of the system may be maximized. For example, one annotator may be better adapted relative to another annotator at identifying and labeling funding bodies having a person's name while the other annotator may be better adapted to identifying and labeling organizational or government entities, as described in greater detail herein.

At step 370, the one or more potential entities labeled by each of the two or more annotators (e.g., the first annotator and the second annotator) may be extracted from the paragraphs. Once extracted, an ensemble mechanism implemented by the system determines the funding information from the one or more potential entities. That is, the ensemble mechanism may employ a machine learned ensemble model to identify and select the correct entities form the one or more potential entities that corresponds to the funding information defined within the text document. The ensemble mechanism will be described in more detail with reference to FIGS. 4 and 5.

Figure 4:
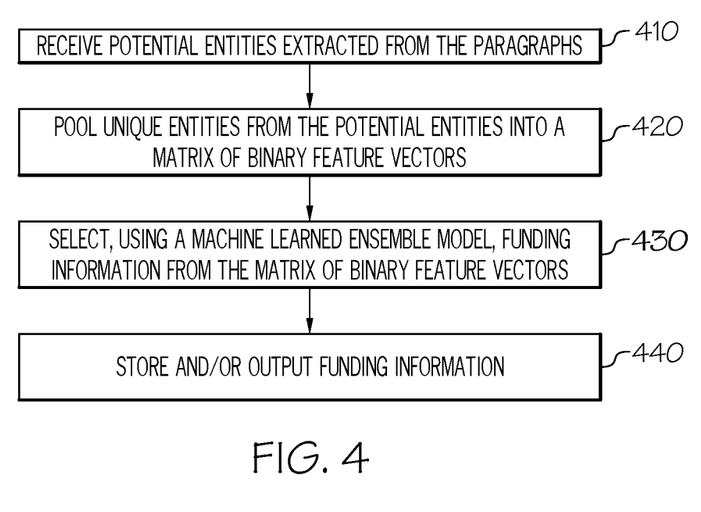
FIG. 4 depicts a flowchart for another example method of extracting funding information from text, according to one or more embodiments shown and described herein.
Figure 5:
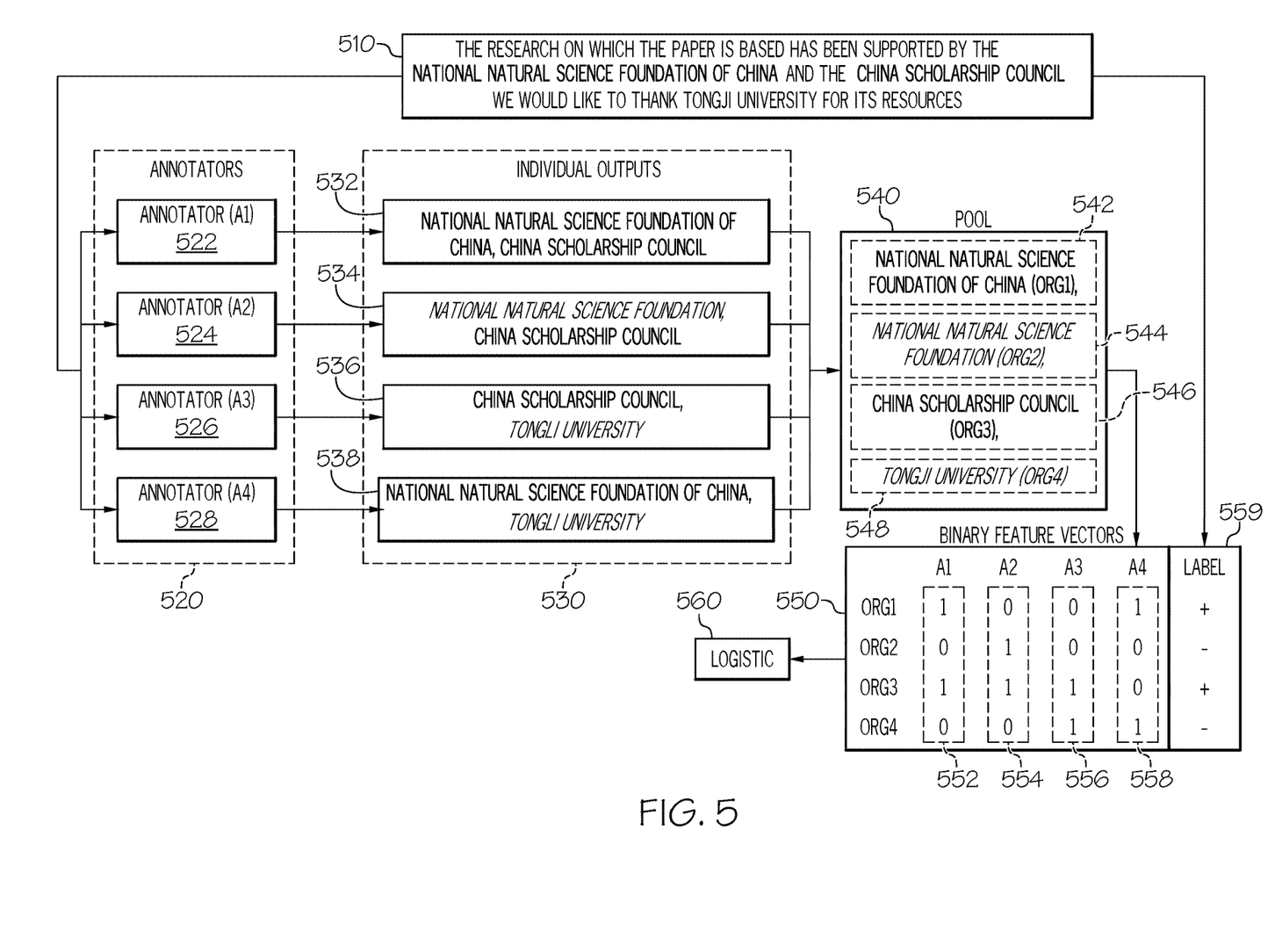
FIG. 5 schematically depicts an illustrative example of an ensemble mechanism approach to extracting funding information from text, according to one or more embodiments shown and described herein.

Referring now to FIG. 4, a flowchart for an example ensemble mechanism approach to extracting funding information from text, according to one or more embodiments described herein is depicted. As described above, the ensemble mechanism may implement a machine learned ensemble model to determine which of the one or more potential entities correctly captures the funding information defined in the text document. At step 410, the ensemble mechanism may receive the one or more potential entities labeled by each of the two or more annotators and extracted from the paragraphs. At step 420, the one or more potential entities are pooled into a set of unique entities. That is, some annotators may label the same one or more potential entities within a paragraph. By pooling the one or more potential entities, duplicates of the one or more potential entities are combined. Once the set of unique entities are defined, a matrix of binary feature vectors is generated for each of the annotators. Each of the elements in a binary feature vector for a particular annotator corresponds to a one of the unique entities and the value of the element corresponds to whether that particular annotator labeled the unique entity. An illustrative example is provided in FIG. 5. Referring to FIGS. 4 and 5, at step 430, the ensemble mechanism may then implement a machine learned ensemble model, which selects the correct entities that define the funding information recited within the text document. The machine learned ensemble model learns to select the correct entities from the matrix of binary feature vectors generated by trained annotators annotating sets of annotated training data. In some embodiments, the machine learned ensemble model implements a logistic regression model. For example, training the ensemble mechanism may be accomplished using a particular algorithm, such as the algorithm depicted in Table 1 below.

Data: Trained annotators A, Sets of annotated training data (e.g., annotated text sections) S Result: Trained machined learned ensemble model implementing a logistic regression R

TABLE 1

```
Generate an empty set of Features F and labels L
do
    do
            Use annotator Aj to annotate Sj,
            producing a set of annotations Nj;
            Let the unique pool of all such annotations be Ui
    while   Aj ∈ A;
    do
            Initialize a vector V of length |A|
            filed with 0s;
            If Uk ∈ Nj, then Vj = 1. Do this for all j;
            Append V to F;
            If Uk is a true annotation for Si,
            append "positive" to L, else
            "negative";
    while   Uk ∈ Ui;
while       Si ∈ S;
Train R using F and L
```

At step 440, the funding information generated by the methods described herein may be stored in the data storage component for later use or transmitted to a user computing device, for example, in response to query pertaining to the funding information.

Referring to FIG. 5, an illustrative example of an ensemble mechanism approach to extracting funding information from text, according to one or more embodiments described herein is depicted. The illustrative example described herein is from a training point of view; however, implementation of the ensemble mechanism would be similar except for the inclusion of supervised training labels 559. In the illustrative example depicted in FIG. 5, the following piece of text 510 is considered: "The research on which this paper is based has been financially supported by the National Natural Science Foundation of China, and the China Scholarship Council. We would like to thank Tongji University for its resources." The terms "National Natural Science Foundation of China" and the "China Scholarship Council" are the FB entities the ensemble mechanism should correctly select once trained because these two funding bodies have previously been identified as financially supporting the research of the paper as recited in the sentence. Although the term "Tongji University" is also an organization name, in this case it does not correspond to funding information because it is only mentioned as a thanks for its resources, not financial support. The annotators learn to identify the FB entities through training examples, which provide example organization names and corresponding relationships between other keywords within the sentences, such as "financially supported" or "resources" that may trigger the context for the presence of funding information. Conversely, keywords such as "thanks" may trigger context for non-funders. The training begins by annotating the piece of text using two or more annotators 520. As depicted in the illustrative example, there are four annotators: Annotator (A1) 522, Annotator (A2) 524, Annotator (A3) 526, and Annotator (A4) 528. Each of the annotators 520 label one or more potential entities 530 within the piece of text 510. For example, Annotator (A1) 522 labels "National Natural Science Foundation of China" and "China Scholarship Council" 532; Annotator (A2) 524 labels "National Natural Science Foundation" and "China Scholarship Council" 534; Annotator (A3) 526 labels "China Scholarship Council" and "Tongji University" 536; and Annotator (A4) 528 labels "National Natural Science Foundation of China" and "Tongji University" 538 as FB entities.

In this example, the Annotator (A1) 522 annotates both entities correctly, Annotator (A2) 524 annotates the "China Scholarship Council" but misses the "National Natural Science Foundation of China" by wrongly annotating "National Natural Science Foundation" as FB, Annotator (A3) also annotates the "China Scholarship Council" but confuses "Tongji University" as a FB entity, and finally, Annotator (A4) 528 misses "China Scholarship Council," possibly because it is not part of the vocabulary used by the annotator. Thus, when the one or more potential entities from each of the annotators 520 are pooled together, four unique entities 540 from all the annotators are identified: "National Natural Science Foundation of China" (Org 1) 542 and "China Scholarship Council" (Org 3) 546, which are both correct, and "National Natural Science Foundation" (Org 2) 544 and "Tongji University" (Org 4) 548, which are wrong.

From the pooling of the unique identifiers, a matrix of binary feature vectors 550 is produced. In this case, the matrix includes four dimensions. Each of the elements in a binary feature vector for a particular annotator corresponds to a one of the unique entities and the value of the element corresponds to whether that particular annotator labeled the unique entity. For example, the binary feature vector for Annotator (A1) 522 is [1,0,1,0] 552 where each element corresponds to one of the unique entities from pooling and the binary value corresponds to whether Annotator (A1) 522 labeled the corresponding unique vectors during its annotation of the piece of text 510. Now that the ensemble mechanism has generated a matrix of binary feature vectors 550 (e.g., individually Annotator (A1) 522 corresponds to a first vector 552, Annotator (A2) 524 corresponds to a second vector 554, Annotator (A3) 526 corresponds to a third vector 556, and Annotator (A4) corresponds to a fourth vector 558), the machine learned ensemble model implementing a logistic regression model is used to determine the correct entities for the funding information. However, as stated above, the illustrative example depicted in FIG. 5 herein depicts the additional element of training the logistic regression model 560. That is, manually curated pieces of text may be used so that the ensemble mechanism may compare the machine learned ensemble model's output based on the matrix of binary feature vectors 550 to the supervised training labels 559, which identify the correct entities for the funding information. Through multiple iterations and multiple pieces of text 510 having the supervised training labels 559, the logistic regression model 560 is learned and the ensemble mechanism may operate independent of supervision. That is, the ensemble mechanism may automatically extract funding information from text documents.

Experiments and Results

The following presents experimental results from evaluating the different components of the systems and methods for automatically extracting funding information from a text document. For the comparison of the alternative approaches, the Micro-averaged measures of Precision (P), Recall (R), and F-score (F1) were used.

Tables 2 and 3 present the results of the annotation of FB and GR respectively, on the text segments which contain funding information, and which were identified by the previous step of the process. The tables present the results from multiple approaches and compare the multiple approaches against the FundingFinder, which is the approach described herein, which ensembles in a novel manner the two or more annotators. In general, the multiple approaches include the use a single annotator implementing a single model such as Conditional Random Fields (CRF), Hidden Markov Modeling (HMM), Maximum Entropy Estimation (MaxEnt) or the like trained on a set of annotated training data. For example, LingPipe is a pre-trained model that implements HMM and Stanford is a pre-trained model that implements a CRF. Besides the two approaches listed as FPE and Rule-based, the tables list the compared approaches by using the naming convention: <approach_name>-{Pre, S,G}, where "Pre" indicates that the approach is used with one of the pre-trained models in the original toolkit, "S" indicates that the approach was trained on the "silver" set, and "G" indicates that the approach was trained on the "gold" set. For example, CRF-S refers to the Stanford Core NLP CRF approach and, more precisely, that in this case it was tested with a model trained on the "silver" set. The FPE and the Rule-based approaches do not require such a clarification, as they do not use any of these sets as training. All of the presented approaches were tested on the "gold" set, using 10-fold cross validation (i.e., a technique to evaluate predictive models by partitioning the test sample into a training set to train the model and a test set to evaluate it), and the P, and R and F1 reported scores are micro-averaged.

Table 2, which presents the performance of the compared approaches in annotating FB, shows that the pre-trained models perform the poorest, which was anticipated, as they were trained for a completely different task and in much different data. Another finding is that the CRF models perform better than the rest in this task, with an observed increased overall performance when the distributional similarity features are used. This suggests that word embeddings could also be used within the CRFs, and could probably offer a more accurate semantic representation of the words that are used as features, as opposed to the simpler distributional similarity used here, which considers simple co-occurrence of words. It is also very important to note that FundingFinder (i.e., the name for the system and method described herein), which ensembles two or more annotators, outperforms the next best model by 6 percentage points (p.p.) in precision, 2 p.p. in recall, and 5 in F1 score.

TABLE 2

| Method | P | R | F1 |
| --- | --- | --- | --- |
| LingPipe-Pre | 0.18 | 0.31 | 0.23 |
| Stanford-Pre | 0.35 | 0.54 | 0.42 |
| CRF-S | 0.49 | 0.43 | 0.46 |
| HMM-S | 0.36 | 0.48 | 0.41 |
| MaxEnt-S | 0.50 | 0.39 | 0.44 |
| CRF-G | 0.64 | 0.58 | 0.61 |
| CRF-dsim-G | 0.66 | 0.61 | 0.63 |
| HMM-G | 0.49 | 0.54 | 0.52 |
| MaxEnt-G | 0.64 | 0.54 | 0.59 |
| FPE | 0.48 | 0.46 | 0.47 |
| FundingFinder | 0.72 | 0.63 | 0.68 |

Similar findings can be drawn from Table 3 on the annotation of GR, with the main difference being that the absolute scores reported in this table are significantly higher from the ones reported in Table 2, for all approaches. This suggests that the annotation of FB is much harder than the annotation of GR. Therefore, the suggested approach only marginally outperforms the next best model, indicating that grant annotation is simpler and less complicated than its FB counterpart.

TABLE 3

| Method | P | R | F1 |
| --- | --- | --- | --- |
| Rule-based | 0.78 | 0.89 | 0.83 |
| CRF-G | 0.91 | 0.91 | 0.91 |
| HMM-G | 0.76 | 0.77 | 0.76 |
| MaxEnt-G | 0.87 | 0.89 | 0.88 |
| FundingFinder | 0.92 | 0.91 | 0.92 |

It should be understood that the systems and methods shown and described herein may be utilized to automatically extract funding information from text documents. It should also be understood that in general, the process begins by ingesting a full text document and splitting it into text segments (e.g., paragraphs). A trained classifier (e.g., implementing a SVM) labels each text segment as one having funding information or not having funding information. The sections, which do not have funding information, are discarded, while the remaining sections are taken forward in the process. Each of the two or more annotators label, independently and separately, the text segments, generating one or more potential entities. The one or more potential entities are used to construct a matrix of binary feature vectors for the machine learned ensemble model. When passed through the machine learned ensemble model, the correct entities are selected and output by the process.

It should also be understood that the systems and methods shown and described herein result in particularly configured computer based systems to automatically extract funding information from text documents in a more efficient and precise manner relative to conventional computer systems. For example, through the implementation of multiple annotators, the strengths of each annotator in identifying one or more potential entities within a text corpus is combined through the ensemble mechanism to deliver more precise and complete funding information from a text document. Additionally, through the non-limiting example of grid-computing, the system may more efficiently utilize available computer resources across several modules. The implementation of a grid-computing framework allows for the division of tasks among several modules, which may be coordinated together to improve the efficiency of processing individual tasks and large amounts of text documents.

The terminology used herein is for the purpose of describing particular aspects only and is not intended to be limiting.

As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of extracting funding information from text, the method comprising:
   receiving, at a computing device, a text document;
   extracting paragraphs from the text document using at least one of a natural language processing model or a machine learning model;
   classifying, using a machine learning classifier, the paragraphs as having funding information or not having funding information;
   discarding the paragraphs classified as not having funding information;
   labeling, using a first annotator, one or more potential entities within the paragraphs classified as having funding information;
   labeling, using a second annotator, one or more potential entities within the paragraphs classified as having funding information, wherein:
      the first annotator implements a first named-entity recognition model and the second annotator implements a second named-entity recognition model that is different from the first named-entity recognition model, and
      the one or more potential entities comprise at least one unique entity labeled by the first annotator or the second annotator;
   extracting the one or more potential entities from the paragraphs classified as having funding information; and
   determining, using an ensemble mechanism, funding information from the one or more potential entities.

2. The method of claim 1, wherein the ensemble mechanism:
   receiving the one or more potential entities labeled by the first annotator and the second annotator;
   pooling the at least one unique entity from the one or more potential entities into a matrix of binary feature vectors, wherein the matrix of binary feature vectors defines a vector for each of the first annotator and the second annotator and wherein each element of the vector corresponds to one of the at least one unique entity; and
   selecting, using a machine learned ensemble model, the funding information from the matrix of binary feature vectors, wherein the funding information includes one of the at least one unique entity.

3. The method of claim 2, wherein selecting the funding information comprises implementing a logistic regression model trained from a plurality of binary feature vectors generated from a plurality of annotated training text sections.

4. The method of claim 1, wherein the one or more potential entities include at least one of a funding body or a grant.

5. The method of claim 1, wherein labeling using the first annotator comprises implementing at least one of a conditional random field, a Hidden Markov model, or a MaxEnt model.

6. The method of claim 1, wherein labeling using the first annotator comprises employing a rule-based, gazetteer or machine learning approach to identify the one or more potential entities within the paragraphs as having funding information.

7. The method of claim 1, wherein the machine learning classifier is a support vector machine trained on a plurality of examples of text segments having funding information and not having funding information.

8. A system for extracting funding information from text comprising:
   a processor; and
   a non-transitory, processor-readable memory coupled to the processor, the non-transitory, processor-readable memory comprising a machine readable instruction set stored thereon that, when executed by the processor, causes the processor to:
   receive a text document;
   extract paragraphs from the text document using at least one of a natural language processing model or a machine learning model;
   classify with a machine learning classifier the paragraphs as having funding information or not having funding information;
   discard the paragraphs classified as not having funding information;
   label, with a first annotator one or more potential entities within the paragraphs classified as having funding information;
   label, with a second annotator, one or more potential entities within the paragraphs classified as having funding information, wherein:
      the first annotator implements a first named-entity recognition model and the second annotator implements a second named-entity recognition model that is different from the first named-entity recognition model, and
      the one or more potential entities comprise at least one unique entity labeled by the first annotator or the second annotator;
   extract the one or more potential entities from the paragraphs classified as having funding information; and
   determine, with an ensemble mechanism, a funding information from the one or more potential entities.

9. The system of claim 8, wherein the machine readable instruction set, when executed, further causes the processor to:
- receive the one or more potential entities labeled by the first annotator and the second annotator;
- pool the at least one unique entity from the one or more potential entities into a binary feature vector, wherein the binary feature vector defines a vector for each of the first annotator and the second annotator and wherein each element of the vector corresponds to one of the at least one unique entity; and
- select, using a machine learned ensemble model, the funding information from the binary feature vector, wherein the funding information includes one of the at least one unique entity.

10. The system of claim 9, wherein the machine learned ensemble model comprises a logistic regression model trained from a plurality of binary feature vectors generated from a plurality of annotated training text sections.

11. The system of claim 8, wherein the one or more potential entities include at least one of a funding body or a grant.

12. The system of claim 8, wherein the first annotator implements at least one of a conditional random field, a Hidden Markov model, or a MaxEnt model.

13. The system of claim 8, wherein the first annotator employs a rule-based, gazetteer or machine learning approach to identify the one or more potential entities within the paragraphs as having funding information.

14. The system of claim 8, wherein the machine learning classifier is a support vector machine trained on a plurality of examples of text segments labeled as having funding information and labeled as not having funding information.

15. A grid-computing system for extracting funding information from text, the grid-computing system comprising:
- a first module having a first processor and a first non-transitory, processor-readable memory coupled to the first processor;
- a second module having a second processor and a second non-transitory, processor-readable memory coupled to the second processor;
- a third module having a third processor and a third non-transitory, processor-readable memory coupled to the third processor;
- a fourth module having a fourth processor and a fourth non-transitory, processor-readable memory coupled to the fourth processor;
- wherein:
  - the first module, the second module, the third module, and the fourth module are communicatively coupled through a network;
  - the first non-transitory, processor-readable memory comprising a first machine readable instruction set stored thereon that, when executed by the first processor, causes the first processor to classify paragraphs extracted from a text document as having funding information or not having funding information;
  - the second non-transitory, processor-readable memory comprising a second machine readable instruction set stored thereon that, when executed by the second processor, causes the second processor to label, with a first annotator one or more potential entities within the paragraphs classified as having funding information;
  - the third non-transitory, processor-readable memory comprising a third machine readable instruction set stored thereon that, when executed by the third processor, causes the third processor to label, with a second annotator, one or more potential entities within the paragraphs classified as having funding information, wherein:
    - the first annotator implements a first named-entity recognition model and the second annotator implements a second named-entity recognition model that is different from the first named-entity recognition model, and
    - the one or more potential entities comprise at least one unique entity labeled by the first annotator or the second annotator; and
  - the fourth non-transitory, processor-readable memory comprising a fourth machine readable instruction set stored thereon that, when executed by the fourth processor, causes the fourth processor to determine with an ensemble mechanism a funding information from the one or more potential entities.

16. The grid-computing system of claim 15, wherein the fourth machine readable instruction set, when executed, further causes the fourth processor to:
- receive the one or more potential entities labeled by the first annotator and the second annotator;
- pool the at least one unique entity from the one or more potential entities into a binary feature vector, wherein the binary feature vector defines a vector for each of the first annotator and the second annotator and wherein each element of the vector corresponds to one of the at least one unique entity; and
- select, using a machine learned ensemble model, the funding information from the binary feature vector, wherein the funding information includes one of the at least one unique entity.

17. The grid-computing system of claim 16, wherein the machine learned ensemble model comprises a logistic regression model trained from a plurality of binary feature vectors generated from a plurality of annotated training text sections.

18. The grid-computing system of claim 15, wherein the one or more potential entities include at least one of a funding body or a grant.

19. The grid-computing system of claim 15, wherein the first annotator implements at least one of a conditional random field, a Hidden Markov model, or a MaxEnt model.

20. The grid-computing system of claim 15, wherein the first annotator employs a rule-based, gazetteer or machine learning approach to identify the one or more potential entities within the paragraphs as having funding information.

* * * * *